United States Patent

[11] 3,584,809

| [72] | Inventor | Ralph Ogden, Sr.<br>1304 Fisher St., Munster, Ind. 46321 |
|---|---|---|
| [21] | Appl. No. | 859,350 |
| [22] | Filed | Sept. 19, 1969 |
| [45] | Patented | June 15, 1971 |

[54] REEL FOR COILS OF WELDING WIRE
6 Claims, 5 Drawing Figs.

[52] U.S. Cl. .................................................. 242/129, 242/105
[51] Int. Cl. ........................................................ B65h 49/00
[50] Field of Search ........................................... 242/105, 129; 314/68

[56] References Cited
UNITED STATES PATENTS

| 2,188,070 | 1/1940 | Baird et al. ..................... | 242/129 |
| 3,326,495 | 6/1967 | De Bruyn ....................... | 242/129 |
| 3,395,308 | 7/1968 | Meyer ............................. | 314/68 |

Primary Examiner—Leonard D. Christian
Attorney—Mann, Brown, McWilliams & Bradway ABSTRACT: A reel for mounting welding wire coils in which the reel is in the form of a holding frame defining a central hub portion that is mounted on a suitable support and four arms extending radially from the hub portion and each equipped with a stud that projects axially to the hub portion and receives a holder member, including a holder finger that engages the coil to hold same and a cam surface aligned circumferentially with the holder finger and engages within the coil core to bind same to the reel, a latch device for the respective finger members that latches the finger members in extended and retracted positions circumferentially to the stud, while permitting lateral adjustment longitudinally to the studs, and a clamp nut for each stud to clamp the respective finger members against a coil applied to the reel frame.

Inventor
Ralph Ogden, Sr.
By
Mann, Brown, McWilliams & Bradway
Attys.

Inventor
Ralph Ogden, Sr.
By
Mann, Brown, McWilliams & Bradway
Attys.

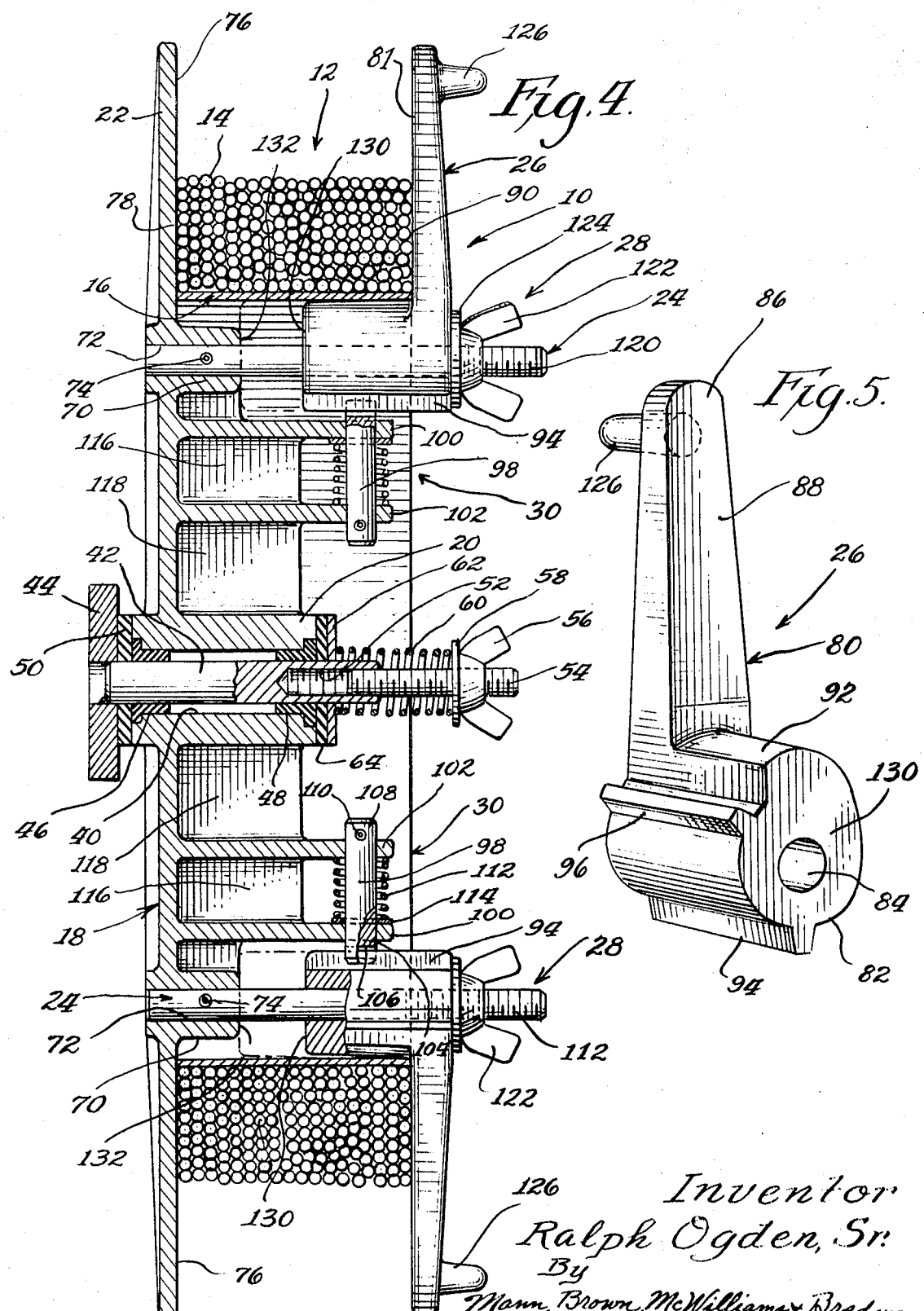

REEL FOR COILS OF WELDING WIRE

REEL FOR COILS OF WELDING WIRE

This invention relates to a reel for mounting coils of welding wire, and more particularly, to a reel-type coil holding device for mounting on a welding machine or the like, coils of welding wire that are to be expended through a welding gun to the arc of welding equipment of the semiautomatic or automatic type.

The welding wire source of supply of semiautomatic-type welding equipment usually takes the form of a coil of the wire suitably mounted on a reel carried by the equipment, and it has become common practice to arrange the reels so that fresh coils can be readily applied thereto.

This necessarily involves a suitable means of clamping the coil to the reel, a means of suitably mounting the reel so that the welding wire will readily pay off of same, and arranging the reel to accommodate different size coils.

Conventional coil holders present significant difficulties to welders in applying coils to same, as the reel elements that engage the coil require accurate positioning to insure firm contact with the coil even though guesswork is required to do this, and adjustment to accommodate coils of different axial thicknesses requires removal of the spacer sleeves and shear pins therefor that is time consuming and vexatious in nature.

The principal object of the invention is to provide a coil holder arrangement that is self-adjusting for different coil thicknesses, and that involves a coil holder member lock arrangement that makes coil changing simple, reliable and easy.

Another principal object of the invention is to provide a coil holder that makes coil changing uncomplicated and readily handled by even the most inexperienced welder.

Yet other objects of the invention are to provide a coil holder that is economical of manufacture, convenient to install and use, and long lived in operation.

Other objects, uses, and advantages will be obvious or become apparent from a consideration of the following detailed description and the application drawings.

In the drawings:

FIG. 4 is a diagrammatic cross-sectional view through the reel substantially along line 4—4 of FIG. 1; and FIG. 5 is a perspective view of one of the holding finger members.

Figure 1:
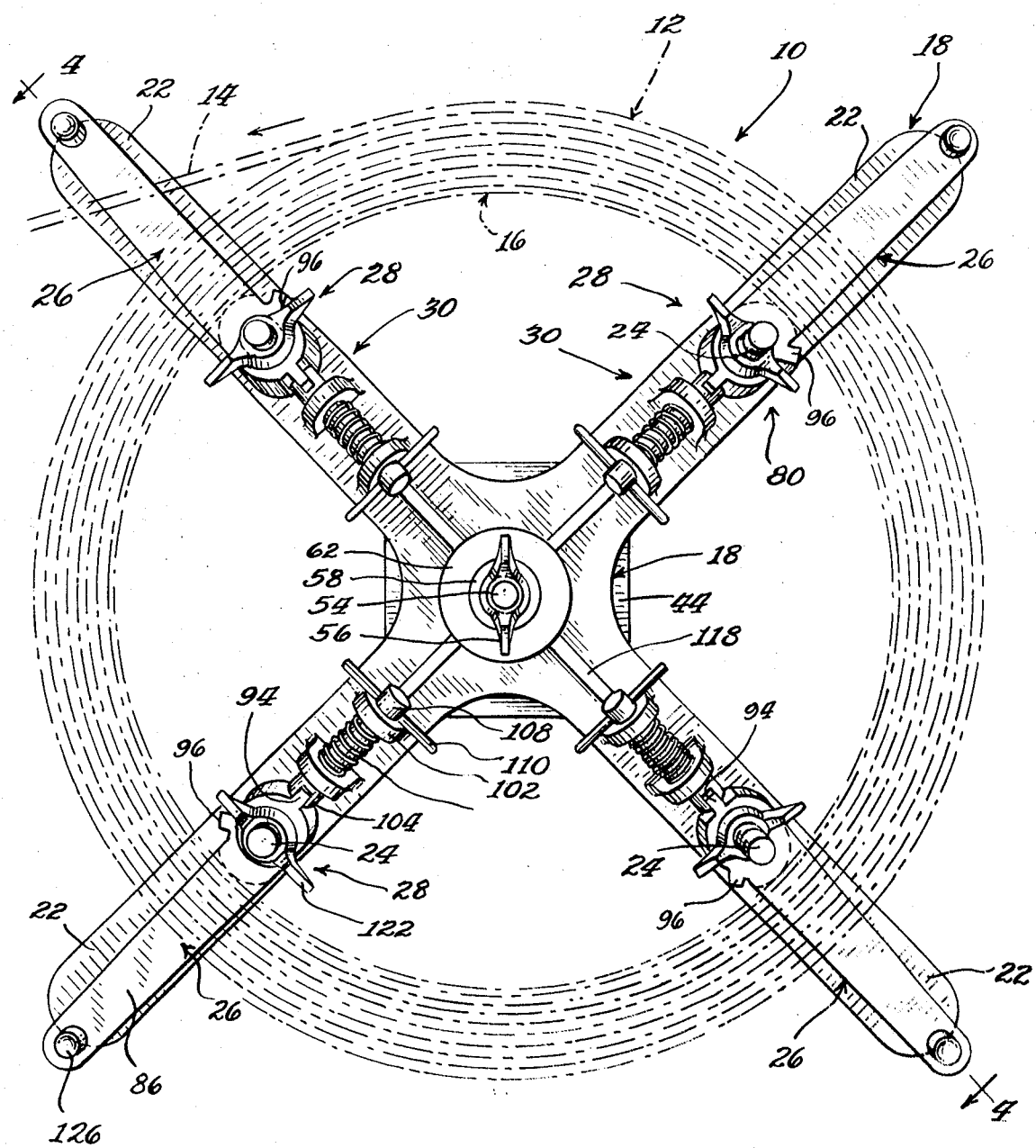
FIG. 1 is a frontal perspective view of the reel, with a welding wire coil shown applied thereto in broken lines.

However, it is to be understood that the specific embodiments illustrated are supplied primarily to comply with the requirements of the U.S. Patent Code, and that the invention may have other specific embodiments which will be obvious to those skilled in the art.

Referring now more specifically to the drawings, reference numeral 10 generally indicates one embodiment of the invention that is adapted for application to welding machines of the semiautomatic type for the purpose of mounting a welding wire coil 12, which conventionally consists of a length of welding wire 14 suitably coiled about a cardboard core 16.

The reel 10 comprises a frame 18 defining a hub portion 20 and a plurality of arms 22 (four in the illustrated embodiment), each of which has applied thereto a stud 24 carrying a coil holder finger member 26 that may be clamped against the coil by suitable clamp device 28, and that is held in extended and retracted positions by lock device 30 that is of special significance.

The reel hub portion 20 is bored as at 40 (see FIG. 4) to receive a suitable spindle 42 which is in turn fixed as by welding to a mounting collar 44 that is fastened to the welding machine in any appropriate manner.

For insulating purposes, sleeves 46 and 48 formed of any suitable electrically insulating material, are interposed between the axle 42 and the reel hub portion 20, and a washer 50, also formed of suitable electrically insulating material, is interposed between the mounting collar 42 and the hub portion 20.

In the form shown, the spindle 42 is drilled and tapped as at 52 to threadedly receive threaded stud 54 that threadedly carries wing nut 56 that bears against washer 58 which in turn seats against the compression spring 60 bearing against disc 62 that in turn bears against a disc 64 (formed of electrically insulating material), which in turn bears against the frame hub portion 20.

Each of the reel frame arms 22 is formed with a tubular socket portion 70 (see FIG. 4) defining a bore 72 in which the respective studs 24 are received. The studs 24 have outer diameters that substantially complement the internal diameters of the bore 72, and are held in place by suitable pins 74 press fitted into place through appropriate aligned holes in the respective studs 24 and the sockets 70.

Radially outwardly of the respective sockets 70, the respective frame arms 22 define abutment surfaces 76 that are adapted to be engaged by one side surface 78 of the coil 12.

Mounted on each stud 24 for movement longitudinally thereof is a finger or holder member 26. Each finger member 26 comprises a body 80 including a hub portion 82 bored as at 84 to receive the respective studs 24, with the internal diameter of the bores 84 being substantially complementary to the outer diameter of the studs 24 for a slideable fit thereto. Associated with the hub portion 82 of each holder member 26 is a finger 86 that extends radially to the respective hub portions 82 and defines an abutment surface 88 adapted to engage the other side 90 of the coil 12.

Each hub portion 82 is formed to define cam surface 92 which is eccentrically related to the axis of the respective finger member bores 84, and which is aligned with the respective arms 86 circumferentially to the respective hub portions 82.

Hub portions 82 also define a first lug 94 and a second lug 96 that extend the length of the respective hub portions 82, and are located in particular angular orientations with respect to the finger 86.

Figure 2:
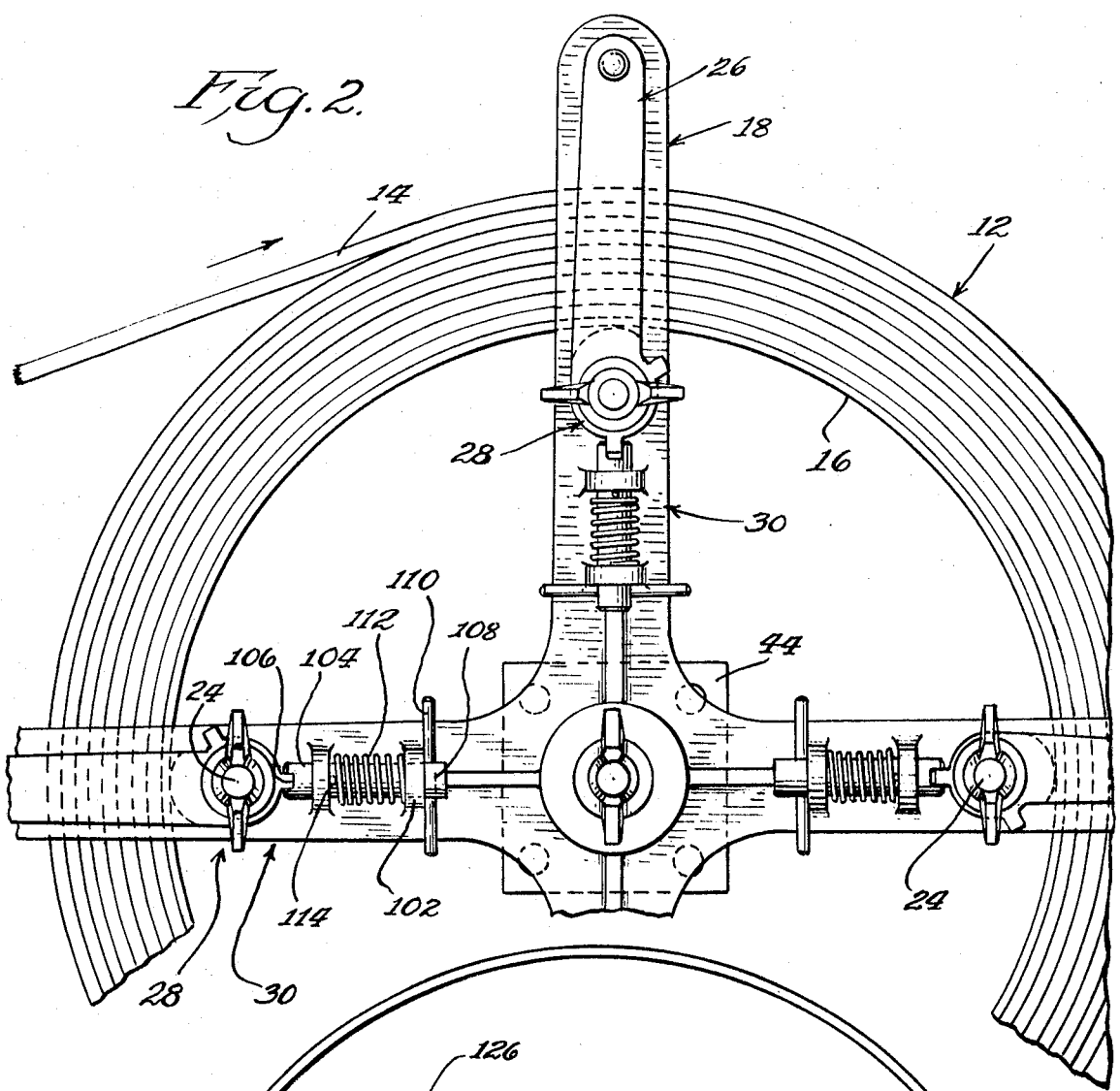
FIG. 2 is a side elevational view of the reel with parts broken away, and showing the welding wire coil in full lines.
Figure 3:
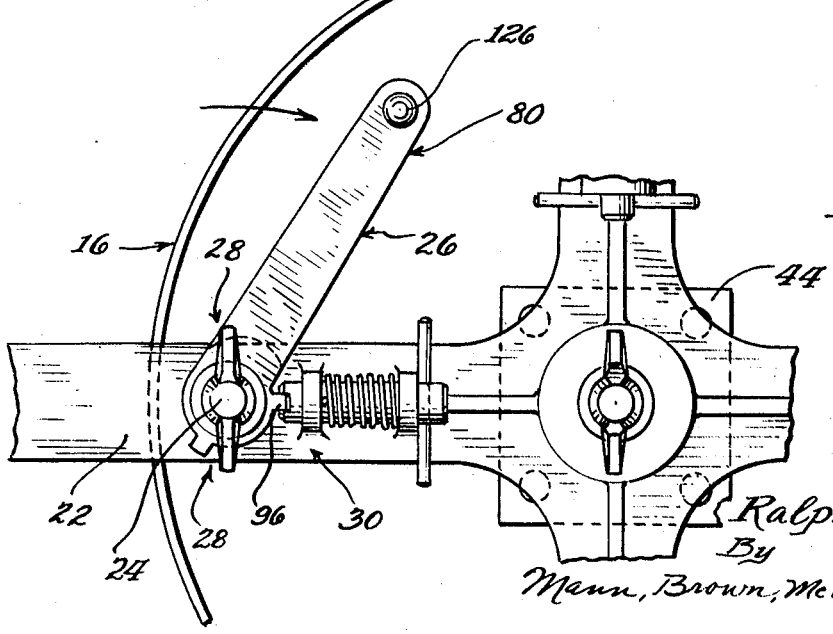
FIG. 3 is a view similar to FIG. 2, but showing one of the holding finger members moved to the retracted position for ready removal of the welding wire coil cardboard core and application of another welding wire coil thereto.

The lugs 94 and 96 form a part of the respective latching devices 30, which also include a latch pin 98 slidably mounted in spaced flanges 100 and 102 of the respective frame arms 22. As indicated in FIGS. 1, 2 and 3, each latch pin includes a latching end 104 that is slotted as at 106 to receive the respective lugs 94 and 96 (compare FIGS. 2 and 3), and a handle end 108 to which is applied a suitable handle 110 for retracting same against compression spring 112, that is applied between the flange 102 and a crosspin 114 carried by the respective latch bars for the purpose of biasing the respective latch bars in the direction of the respective latch members.

The flanges 100 and 102 are interconnected by suitable strengthening web 116, and strengthening web 118 connects the respective flanges 102 to the frame hub portion 20.

Each of the studs 24 is externally threaded at its projecting end 120 for threaded mounting of wing nut 122 that is employed to clamp the respective finger members 26 against the coil 12. In the form shown, suitable washers 124 are employed between the respective wing nuts and finger members 26. Nuts 122, washers 124 and studs 24 thus form the respective clamping devices 28.

Each finger member 26 is provided with a handle 126 to aid in manipulating same.

Studs 24 are positioned radially toward frame hub 20 such that when finger members 26 are in their retracted positions of FIG. 3, the coil core will pass readily over the finger members 26, but when the finger members 26 are moved to their extended positions, cam surfaces 92 of the finger members 26 will bias the portions of the coil core they engage radially outward from the frame hub 20 without unduly indenting the core.

In use, the frame 22 is mounted on spindle 42 in the manner illustrated in FIG. 4, and stud 54 is turned into bore 52 to the desired position (in which it may be fixed in any suitable manner, as by employing a suitable adhesive between the two).

Discs 62 and 64 together with spring 60, washer 58 and wing nut 56 are applied in the manner indicated, with wing nut 56 being turned against the compression of spring 60 to provide the amount of adjustable drag braking action to the rotational movement of the frame 22 that may be required for proper payout of the wire.

To apply a coil 12 to the reel 10, the finger members 26 are positioned in the retracted position shown in FIG. 3, as by withdrawing slotted pin 104 so that the finger members can be positioned to align their respective lugs 96 with the slot 106 of the respective latch bars whereupon on release of the respective latch bars, the finger members 26 are latched in the retracted position indicated. In this connection it will be noted that the lugs 94 and 96 are radially disposed with respect to the hub portions 82 of the respective finger members 26, and the lugs 94 and 96 make an obtuse angle with respect to each other. Likewise, latching of the respective finger members 26 in the position of FIG. 3 disposes the respective finger members 26 at an obtuse angle with respect to the frame arms 22 on which they are mounted, relative to the extended position of the respective fingers 26 (see FIGS. 1 and 2).

When all four of the finger members 26 have been positioned in the manner indicated in FIG. 3, the coil 12 may be readily slipped over same to dispose the coil side surface 78 against the respective abutment surfaces 76 of the frame arms 22. The respective finger members 26 are then drawn outwardly from their respective studs 24 (which is allowed by the sliding action permissible between lugs 96 and the respective latch pins 98) as may be necessary to position their fingers 86 for swinging outwardly just clear of the coil, and then are positioned in the relative position shown in FIGS. 1 and 2, by withdrawing the respective latch pins 98 to permit the turning of the respective finger members 26 (as by grasping handles 126) back into alignment with the respective frame arms 22, whereupon the respective lugs 94 are positioned for latching by the latch pins 98, which is accomplished by releasing the respective latch pins 98.

In so positioning each finger member 26, the cam surface 92 of the respective holder finger 26 is brought into firm engagement with the core 16 of the coil 12. As each finger member 26 is operated in the manner indicated, the coil 12 becomes subject to a radial distending force acting radially to the coil which effectively binds the coil to the reel 10.

As part of this procedure, in the event the respective finger members 26 need to be moved away from the respective frame arms 22 to accommodate the width of coil 12 employed, the respective wing nuts 22 may be backed off of the respective studs 24 as is necessary for this purpose. When the finger members 26 have been positioned in their extended positions of FIGS. 1 and 2, and latch pins 98 made operative against lugs 94, wing nuts 122 may be turned against finger members 26 to set their abutment surfaces 88 against the sides 90 of the coil, latch devices 30 permitting this relative movement.

A significant improvement provided by this invention is that the finger members 26 are readily adjustable longitudinally to their respective studs 24 when latched in their respective extended and retracted positions by devices 30 (assuming wing nuts of devices 28 are suitably withdrawn for this purpose). As is indicated by FIG. 4, the latch pins 98 are disposed in substantial alignment with the respective fingers 88 in the minimum spacing position provided by same, wherein the ends 130 of the respective hub portions thereof seat against the ends 132 of the respective socket portions 70 of the frame 18. Thus, the finger members 26 remained locked against movement between their extended and retracted positions (circumferentially of the respective studs 24) while remaining fully adjustable longitudinally or axially to stud 24 to the limits provided by the wing nuts 122 and the engagement of ends 130 and 132.

This means that when the finger members 26 have been locked by devices 30 in their extended positions of FIGS. 1 and 2, with the coil 12 in place, they will be movable against the coil 12 for firmly clamping same in place, under the clamping action provided by the respective wing nuts 122. Furthermore, finger member can move their full range of adjustment longitudinally to the respective studs without having to bother aligning the ends 130 of fingers 26 with lugs or pins located in the area covered by coil 12, or changing movement limit pins and spacer sleeves that are conventionally frequently associated with studs 24.

Similarly, when an empty coil core 16 is to be removed and a new coil applied to the reel 10, fingers 26 are readily swung to the retracted positions and moved to the position of minimum coil width (that is illustrated by FIG. 4), if desired, with the same confidence.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A reel for mounting welding wire coils, said reel comprising:

a frame comprising a hub portion and a plurality of arms extending from said hub portion radially of the axis of said hub portion, said arms being disposed in substantial coplanar relation, each of said arms intermediate their ends carrying a stud extending perpendicular to the plane of said arms, said studs being positioned substantially equally distance from said axis, with the portions of the respective arms extending radially outwardly of said hub portion beyond the respective studs each defining an abutment surfacing facing in the direction of said studs, each of said studs carrying a holder member including a sleeve through which the respective studs extend and a laterally directed finger, with the sleeves of the respective holder members being formed with a cam surface projecting radially of the respective stud and disposed in alignment with the respective fingers thereof circumferentially of the respective sleeves, and with the fingers of the respective holder members each defining an abutment surface opposing the plane of said frame arms, and latch means for the respective holder members to releasably latch same against swinging movement about their respective studs, from a first extended position in which the fingers of the respective holder members are aligned with the respective frame arms carrying same, and from a second retracted position in which fingers of the respective holder members are disposed substantially crosswise of the respective frame arms carrying same, said latch means for each holder member comprising lug and slot means extending longitudinally of the respective holder member sleeves, whereby said holder members are adjustable longitudinally of their respective sleeves when latched in either of said positions between an inner position in which their said surfaces are disposed at a minimum distance from said frame area surfaces and an outer position in which their said surfaces are disposed at a maximum distance from said frame arm surfaces, and means carried by the respective studs for releasably securing the respective holder members against said movement longitudinally of said sleeves thereof.

2. The holder set forth in claim 1 wherein:

said latch means for each holder member further comprises
first and second lugs on the respective sleeves and extending substantially radially and longitudinally thereof,
a latch pin reciprocably mounted on the respective frame arms and having one end thereof slotted transversely thereof to slidingly receive the respective sleeve lugs,
said pin ends being respectively directed at the respective studs,
and means for resiliently biasing the respective rods toward the respective studs,
whereby when the respective lugs of the respective holder members are received in said end slots of the respective latch pins thereof, said holder members are latched in one of said positions.

3. The holder set forth in claim 2 wherein:
said latch pins are positioned to extend normally to the respective holder member sleeves,
said latch pins being spaced from the respective frame arm surfaces a distance substantially equivalent to the spacing of said holder member fingers from said frame arm surfaces when said holder members are disposed in their said inner positions.

4. The holder set forth in claim 3 wherein:
said cam surfaces of the respective holder members are disposed between said abutment surfaces of the respective frame arms and said arms of the respective holder members,
said abutment surfaces of the respective frame arms and finger members being adapted to engage the sides of a welding wire coil applied to said reel, when said holder members have been disposed in said retracted position, a welding wire coil is applied to said reel over said studs, and said holder members have been disposed in their said extended positions and moved to bring the respective fingers thereof into contact with the coil,
with the movement of said holder members from said retracted positions to said extended positions thereof bringing the respective cam surfaces thereof into binding engagement with said coil.

5. The holder set forth in claim 4 wherein:
said releasable securing means comprises means for clamping the respective holder members against a welding wire coil held between same and said reel frame arms.

6. The holder set forth in claim 4 wherein:
said first lugs of the respective holder members when engaged by the respective latch pins dispose the respective holder members in said extended position thereof,
and wherein said second lugs of the respective holder members when engaged by the respective latch pin dispose the respective holder members in said retracted positions thereof, which retracted positions disposed the fingers of the respective holder members at obtuse angles with respect to their said extended positions.